United States Patent
Yoon et al.

(10) Patent No.: US 9,825,271 B2
(45) Date of Patent: Nov. 21, 2017

(54) SEPARATOR FOR ELECTROCHEMICAL DEVICE

(71) Applicant: LG CHEM, LTD., Seoul (KR)

(72) Inventors: Kyung-Hwan Yoon, Daejeon (KR); Bi-Oh Ryu, Daejeon (KR); Sung-Jae Han, Daejeon (KR); Heon-Sik Song, Daejeon (KR); Hyun-Ah Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 93 days.

(21) Appl. No.: 14/901,503

(22) PCT Filed: Nov. 4, 2014

(86) PCT No.: PCT/KR2014/010535
§ 371 (c)(1),
(2) Date: Dec. 28, 2015

(87) PCT Pub. No.: WO2015/069008
PCT Pub. Date: May 14, 2015

(65) Prior Publication Data
US 2016/0149185 A1 May 26, 2016

(30) Foreign Application Priority Data

Nov. 5, 2013 (KR) .................. 10-2013-0133639
Dec. 27, 2013 (KR) .................. 10-2013-0165971
Nov. 4, 2014 (KR) .................. 10-2014-0152434

(51) Int. Cl.
*H01M 2/16* (2006.01)
*H01M 2/14* (2006.01)
*H01M 10/052* (2010.01)

(52) U.S. Cl.
CPC ......... *H01M 2/1686* (2013.01); *H01M 2/145* (2013.01); *H01M 2/162* (2013.01); *H01M 10/052* (2013.01)

(58) Field of Classification Search
CPC .. H01M 2/1686; H01M 2/145; H01M 10/052; H01M 2/162
See application file for complete search history.

(56) References Cited

U.S. PATENT DOCUMENTS

2003/0104273 A1   6/2003   Lee et al.
2006/0008700 A1 *  1/2006  Yong .................. H01M 2/145
                                                    429/144

(Continued)

FOREIGN PATENT DOCUMENTS

CN       102089901 A       6/2011
EP       2 328 220 A2      6/2011

(Continued)

OTHER PUBLICATIONS

International Search Repot, issued in PCT/KR2014/010535, dated Feb. 26, 2015.

*Primary Examiner* — Stewart A Fraser
(74) *Attorney, Agent, or Firm* — Birch, Stewart, Kolasch & Birch, LLP

(57) ABSTRACT

Disclosed is a separator for an electrochemical device including a porous polymer film, and a porous coating layer including at least one type of particles of inorganic particles and organic particles and binder polymer, the porous coating layer formed on one surface or both surfaces of the porous polymer film, wherein the porous polymer film has a structure in which multiple fibrils arranged parallel to the surface of the film are stacked in layers, and a diameter of the fibril disposed at the side of one surface of the film where the porous coating layer is formed is smaller than a diameter of (Continued)

the fibril disposed at a central part in a thickness-wise direction of the film, and an electrochemical device comprising the same.

18 Claims, 12 Drawing Sheets

(56) References Cited

U.S. PATENT DOCUMENTS

| | | | |
|---|---|---|---|
| 2006/0046149 A1* | 3/2006 | Yong | H01M 2/166 429/251 |
| 2006/0103055 A1 | 5/2006 | Hoshuyama et al. | |
| 2009/0325058 A1* | 12/2009 | Katayama | H01G 9/02 429/142 |
| 2011/0256443 A1* | 10/2011 | Park | H01M 2/162 429/145 |
| 2011/0259505 A1 | 10/2011 | Lee et al. | |
| 2011/0305941 A1* | 12/2011 | Park | H01M 2/162 429/145 |
| 2011/0311856 A1 | 12/2011 | Matsui et al. | |
| 2012/0164514 A1 | 6/2012 | Hayakawa et al. | |
| 2013/0017430 A1 | 1/2013 | Terakawa et al. | |
| 2015/0004467 A1 | 1/2015 | Kim et al. | |
| 2016/0204406 A1* | 7/2016 | Ryu | H01M 2/145 429/144 |
| 2016/0218340 A1* | 7/2016 | Ryu | H01M 2/18 |

FOREIGN PATENT DOCUMENTS

| | | | |
|---|---|---|---|
| EP | 3 026 733 A1 | 6/2016 | |
| JP | 2002-289165 A | 10/2002 | |
| JP | 2004-519824 A | 7/2004 | |
| JP | 2008-524824 A | 7/2008 | |
| JP | 2011-162773 A | 8/2011 | |
| KR | 10-0877161 B1 | 1/2009 | |
| KR | 10-2011-0035847 A | 4/2011 | |
| KR | 10-2012-0104425 A | 9/2012 | |
| KR | 10-2013-0091459 A | 8/2013 | |
| WO | WO 99/48959 A1 | 9/1999 | |
| WO | WO 2006/068428 A1 | 6/2006 | |
| WO | WO 2014046094 A1 * | 3/2014 | H01M 2/162 |

* cited by examiner

SEPARATOR FOR ELECTROCHEMICAL DEVICE

TECHNICAL FIELD

The present disclosure relates to a separator for an electrochemical device, and more particularly, to a separator for an electrochemical device with improved mechanical and thermal performance.

The present application claims priority to Korean Patent Application No. 10-2013-0133639 filed in the Republic of Korea on Nov. 5, 2013, the disclosure of which is incorporated herein by reference.

Also, the present application claims priority to Korean Patent Application No. 10-2013-0165971 filed in the Republic of Korea on Dec. 27, 2013, the disclosure of which is incorporated herein by reference.

Also, the present application claims priority to Korean Patent Application No. 10-2014-0152434 filed in the Republic of Korea on Nov. 4, 2014, the disclosure of which is incorporated herein by reference.

BACKGROUND ART

Recently, the demand for high capacity and high power electrochemical devices is gradually increasing in small polymer and medium and large electrochemical device markets. A thin-film separator suitable for the design of high capacity and high power electrochemical devices needs to have low electrical resistance and maintain stability.

A substrate for use in a separator may be greatly classified into three in an aspect of its manufacturing methods: first is a method by which a nonwoven fabric type porous substrate is made from thin fibers produced from polyolefin or the like, second is a dry method by which a thick polyolefin film is made and then stretched at a low temperature to cause micro cracks to occur between crystalline domains of polyolefin, called lamellae, to form micro pores, and third is a wet method by which polyolefin and a diluent are blended at a high temperature into a single phase, and after phase separation of the polyolefin and the diluent during cooling, the diluent is extracted to form pores in the polyolefin.

The porous substrate (porous polymer film) manufactured in this way has comparatively poor thermal and mechanical properties, and thus, with an aim to enhance the safety, a porous coating layer including inorganic particles or organic particles and binder polymer is coated on the porous substrate to manufacture a heat resistant composite separator. The binder polymer serves to bind the inorganic particles or organic particles, but as the content of the binder polymer increases, a final product, i.e., the separator, increases in permeation time and electrical resistance increases, resulting in a deterioration in the performance of an electrochemical device.

Particularly, polymer and medium and large electrochemical devices include binder polymer with high content to enhance the adhesive strength between an electrode and a composite separator, and in this case, as the binder polymer content increases, a permeation time and electrical resistance of a final product, a separator, increases.

Therefore, there is a need for technology that allows binder polymer to sufficiently exhibit its unique function without degrading the battery performance such as a permeation time or electrical resistance even if the binder polymer is used in a large amount.

DISCLOSURE

Technical Problem

The present disclosure is designed to solve the above problem, and therefore, the present disclosure is directed to providing a separator for an electrochemical device in which a composite separator with a porous coating layer has improved structural stability and increased air permeability and ionic conductivity, and an electrochemical device comprising the same.

These and other objects and advantages of the present disclosure will be understood by the following description. Also, it will be apparent that the objects and advantages of the present disclosure may be realized by means or methods stated in the appended claims, and combinations thereof.

Technical Solution

To achieve the above object, according to one aspect of the present disclosure, there is provided a separator for an electrochemical device including a porous polymer film, and a porous coating layer including at least one type of particles of inorganic particles and organic particles and binder polymer, the porous coating layer formed on one surface or both surfaces of the porous polymer film, wherein the porous polymer film has a structure in which multiple fibrils arranged parallel to the surface of the film are stacked in layers, and a diameter of the fibril disposed at the side of one surface of the film where the porous coating layer is formed is smaller than a diameter of the fibril disposed at a central part in a thickness-wise direction of the film.

The diameter of the fibril disposed at the side of one surface of the film where the porous coating layer is formed may be smaller two to four times than the diameter of the fibril disposed at the central part in the thickness-wise direction of the film.

The diameter of the fibril disposed at the side of one surface of the film where the porous coating layer is formed may be from 0.01 to 0.04 µm, and the diameter of the fibril disposed at the central part in the thickness-wise direction of the film may be from 0.04 to 0.08 µm.

The separator may include a porous coating layer formed on only one surface of the porous polymer film, and a diameter of the fibril disposed at the side of one surface of the film where the porous coating layer is formed may be smaller than a diameter of the fibril disposed at the side of the other surface of the film where the porous coating layer is not formed.

The diameter of the fibril disposed at the side of one surface of the film where the porous coating layer is formed may be smaller two to seven times than the diameter of the fibril disposed at the side of the other surface of the film where the porous coating layer is not formed.

The diameter of the fibril disposed at the side of one surface of the film where the porous coating layer is formed may be from 0.01 to 0.07 µm, and the diameter of the fibril disposed at the side of the other surface of the film where the porous coating layer is not formed may be from 0.07 to 0.14 µm.

The binder polymer may be disposed at an interface of adjacent particles and may connect the particles to form a porous structure, and a size of the binder polymer may be from 10 to 100 nm.

The porous polymer film may be a porous polyolefin film.

The porous polyolefin film may include polyethylene; polypropylene; polybutylene; polypentene; polyhexene;

polyoctene; copolymers of at least one of ethylene, propylene, butene, pentene, 4-methylpentene, hexene and octene, or mixtures thereof.

A thickness of the porous polymer film may be from 5 to 50 μm, and a pore size and a porosity may be from 0.01 to 50 μm and from 10 to 95%, respectively.

The binder polymer may include at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, or mixtures thereof.

The inorganic particles may include inorganic particles having a dielectric constant greater than or equal to 5, inorganic particles capable of transporting lithium ions, or mixtures thereof.

The inorganic particles having a dielectric constant greater than or equal to 5 may include $BaTiO_3$, $Pb(Zr,Ti)O_3$(PZT), $Pb_{1-x}La_xZr_{1-y}Ti_yO_3$ (PLZT), $PB(Mg_3Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or mixtures thereof.

The inorganic particles capable of transporting lithium ions may include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ based glass ($Li_xSi_yS_z$, 0<x<3, 0<y<2, 0<z<4), $P_2S_5$ based glass ($Li_xP_yS_z$, 0<x<3, 0<y<3, 0<z<7), or mixtures thereof.

The organic particles may include polystyrene, polyethylene, polyimide, melamine-based resin, phenol-based resin, cellulose, modified cellulose, polypropylene, polyester, polyphenylene sulfide, polyaramide, polyamide imide, butylacrylate-ethylmethacrylate copolymers, or mixtures thereof.

Each average grain diameter of the inorganic particles and the organic particles may be independently from 0.001 to 10 μm.

Also, according to one aspect of the present disclosure, there is provided an electrochemical device including a cathode, an anode, and a separator interposed between the cathode and the anode, wherein the separator is the above-described separator for an electrochemical device.

The electrochemical device may be a lithium secondary battery.

Advantageous Effects

According to one embodiment of the present disclosure, as slurry coating is performed on a porous polyolefin film, heat setting is performed at a higher temperature than a traditional heat setting temperature, so a composite separator with improved mechanical and thermal performance and excellent air permeability may be provided.

Also, because a composite separator with a porous coating layer is manufactured by performing heat setting after slurry coating, heat applied during the heat setting process is transmitted to the polyolefin film through the porous coating layer, so heat setting at a comparatively high temperature is enabled and wettability of the coating slurry on a fibril structure of the polyolefin film is improved.

Also, as heat applied during the heat setting process is transmitted to the polyolefin film through the porous coating layer, the polyolefin film has fibrils of a smaller diameter, so the fibrilar number density per unit area increases and an interfacial contact area with the coating slurry for forming a porous coating layer increases, thereby maintenance of a mechanical shape of the polyolefin film is made easier, thermal shrinkage of the composite separator is reduced or prevented, and the peeling strength of the coating layer is improved.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A separator for an electrochemical device according to one aspect of the present disclosure includes a porous polymer film; and a porous coating layer including at least one type of particles of inorganic particles and organic particles and binder polymer, the porous coating layer formed on one surface or both surfaces of the porous polymer film, wherein the porous polymer film has a structure in which multiple fibrils arranged parallel to the surface of the film are stacked in layers, and a diameter of the fibril disposed at the side of one surface of the film where the porous coating layer is formed is smaller than a diameter of the fibril disposed at a central part in a thickness-wise direction of the film.

Here, the fibril represents aggregates of polymer chains constituting the porous polymer film with an increased binding strength between adjacent molecular chains by stretching and orientating the chains in a lengthwise direction during the manufacture of the film.

As a result, the porous polymer film has a structure in which multiple fibrils arranged parallel to the surface of the film are stacked in layers.

Figure 1:
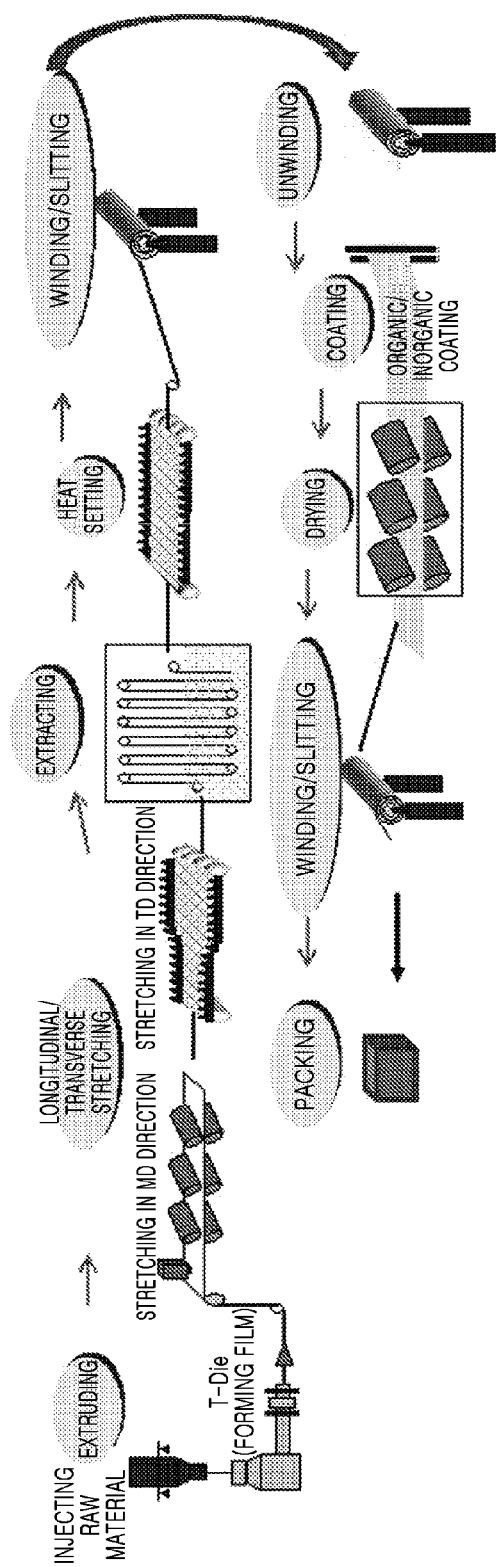
FIG. 1 is a conceptual diagram illustrating a process for manufacturing a separator for an electrochemical device according to a related art.

To manufacture a separator with a porous coating layer by a traditional wet method, as shown in FIG. 1, a resin composition undergoes extrusion/casting, stretching, and extraction, followed by heat setting, to manufacture a porous polymer film, and subsequently, a process of applying a coating slurry to the porous polymer film and drying is performed. The separator with the porous coating layer manufactured in this way has a fibril structure during stretching after a solid/liquid or liquid/liquid phase separation, and through heat setting, its final structure is determined. That is, because the traditional method does not involve slurry coating, the porous polymer film is heat set before a porous coating layer is formed, and thus heat applied to the porous polymer film during heat setting is uniform over the whole, and in the obtained separator, a fibril diameter is uniform in a thickness-wise direction of the porous polymer film.

Figure 2:
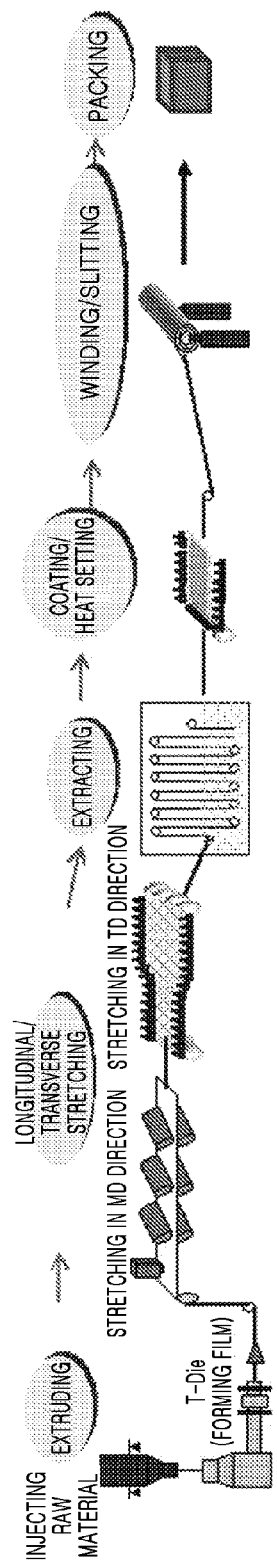
FIG. 2 is a conceptual diagram illustrating a method of manufacturing a separator for an electrochemical device according to an exemplary embodiment of the present disclosure.

Referring to FIG. 2, a method of manufacturing a separator for an electrochemical device according to an exemplary embodiment of the present disclosure includes coating a slurry for forming a porous coating layer on a porous polymer film obtained by extracting a diluent and then performing a heat setting step, and does not include heat setting before the slurry coating step.

As a result, the separator for an electrochemical device according to an exemplary embodiment of the present disclosure already has the porous coating layer on at least one surface of the porous polymer film in the heat setting step, and thus, heat applied to the porous polymer film during heat setting is non-uniform in a thickness-wise direction of the film, and the fibrils of the obtained separator differ in diameter in the thickness-wise direction of the porous polymer film.

The transfer of heat applied to the porous polymer film during heat setting differs based on whether the porous coating layer is formed on one surface or both surfaces, and a final fibril diameter distribution may be influenced thereby.

Figure 3:
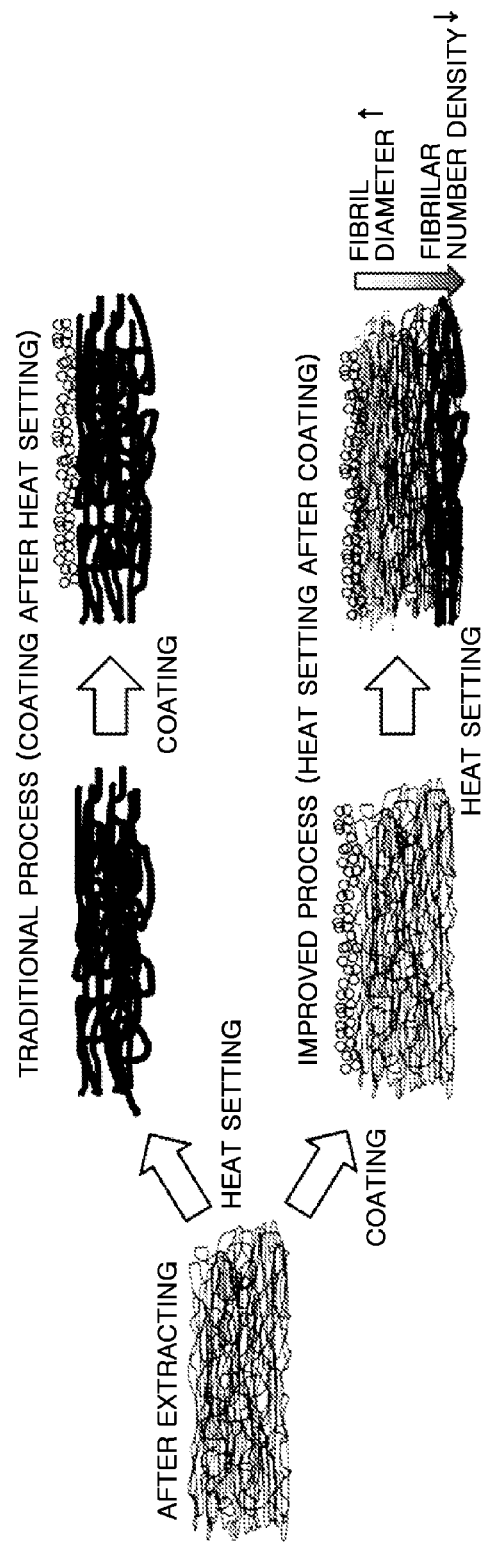
FIG. 3 is a schematic diagram illustrating a comparison of fibril structures between a separator for an electrochemical device by a manufacturing method according to a related art and a separator for an electrochemical device according to an exemplary embodiment of the present disclosure.

First, in the case of the separator with the porous coating layer formed on only one surface of the porous polymer film according to one embodiment of the present disclosure, the effects of direct application and indirect application of the heat setting are presented clearly. In the separator with the porous coating layer formed on only one surface of the porous polymer film, when the porous coating layer is formed and then heat setting is applied, the porous polymer film is indirectly influenced by heat in the presence of the slurry for porous coating and thus the heat transfer is comparatively low. In contrast, when heat setting is directly applied to the porous polymer film on which the porous coating layer is not formed, the porous polymer film is directly influenced by heat and due to partial melting-recrystallization, crystals grow bigger and a fibril diameter increases. As a result, there is a tendency that a gradient occurs such as a gradual increase in a fibril diameter in the thickness-wise direction of the film from the surface of the film where the porous coating layer is formed toward the other surface where the porous coating layer is not formed. In contrast, when slurry coating is performed after heat setting of the porous polymer film like the traditional method, an overall fibril diameter has a uniform value in the thickness-wise direction of the film (See FIG. 3).

That is, the diameter of the fibril disposed on the surface of the film where the porous coating layer is formed is smaller than the diameter of the fibril disposed at the central part in the thickness-wise direction of the film.

Also, in the case of the separator with the porous coating layer formed on both surface of the porous polymer film according to one embodiment of the present disclosure, when slurry coating is performed on both an upper surface and a lower surface of the porous polymer film, during heat setting, the surface where the coating layer is formed is indirectly influenced by heat, but heat is directly transferred to the central part in the thickness-wise direction of the film through the left and right side surfaces of the film where the coating layer is absent. As a result, the diameter of the fibril disposed on the surface of the film where the porous coating layer is formed is smaller than the diameter of the fibril disposed at the central part in the thickness-wise direction of the film.

Also, as discussed above, when the porous coating layer is formed on only one surface of the porous polymer film, the diameter of the fibril disposed on the surface of the film where the porous coating layer is formed is smaller than the diameter of the fibril disposed at the central part in the thickness-wise direction of the film.

According to an exemplary embodiment of the present disclosure, the diameter of the fibril disposed at the side of one surface of the film where the porous coating layer is formed is smaller two to four times, preferably, two to three times than the diameter of the fibril disposed at the central part in the thickness-wise direction of the film.

Also, the diameter of the fibril disposed at the side of one surface of the film where the porous coating layer is formed may be from 0.01 to 0.04 µm, and the diameter of the fibril disposed at the central part in the thickness-wise direction of the film may be from 0.04 to 0.08 µm.

As described in the foregoing, when the porous coating layer is formed on only one surface of the porous polymer film, the diameter of the fibril disposed at the side of one surface of the film where the porous coating layer is formed is smaller than the diameter of the fibril disposed at the side of the other surface of the film where the porous coating layer is not formed.

In this case, the diameter of the fibril disposed at the side of one surface of the film where the porous coating layer is formed is smaller two to seven times, preferably, four to seven times than the diameter of the fibril disposed at the side of the other surface of the film where the porous coating layer is not formed.

Specifically, when the porous coating layer is formed on only one surface of the porous polymer film, the diameter of the fibril disposed at the side of one surface of the film where the porous coating layer is formed may be from 0.01 to 0.07 μm, and the diameter of the fibril disposed at the side of the other surface of the film where the porous coating layer is not formed may be from 0.07 to 0.14 μm.

Also, the fibrilar number density per unit area at the side of one surface of the porous polymer film where the porous coating layer is formed increases and an interfacial contact area with the coating slurry increases, so wettability of the slurry on the polyolefin porous fibril structure may be improved.

Also, the mechanical strength of the separator may be maximized by heat setting, and air permeability and ionic conductivity may be also improved.

The binder polymer is disposed at an interface of adjacent particles and connects the particles to form a porous structure, and a size of the binder polymer disposed at the interface of the particles is from 10 to 100 nm, preferably, from 10 to 50 nm.

According to an exemplary embodiment of the present disclosure, because slurry coating is performed on the porous polymer film dissimilar to the traditional method, heat setting at a high temperature is enabled, and by hot air of high temperature during heat setting, the binder polymer slightly melts and is re-arranged and the binder polymer does not agglomerate. In contrast, according to the traditional method, after slurry coating is performed on the heat set porous polymer film, drying is performed at a relatively low temperature, for example, about 60° C., so only a solvent of the slurry is evaporated and thereby an agglomeration phenomenon of the binder polymer is more noticeable.

The porous polymer film is not limited to a particular material if it is commonly used in the art, and for example, includes a polyolefin polymer film.

The polyolefin is not limited to a particular type if it is commonly used in the art. The polyolefin may include, but is not limited to, for example, polyethylene such as high density polyethylene (HDPE), low density polyethylene (LDPE), linear low density polyethylene (LLDPE), ultra high molecular weight polyethylene (UHMWPE); polypropylene; polybutylene; polypentene: polyhexene: polyoctene: copolymers of at least one of ethylene, propylene, butene, pentene, 4-methylpentene, hexene, and octene, or mixtures thereof.

A thickness of the porous polymer film is not particularly limited, but is preferably from 5 to 50 μm, and a pore size and a porosity of the porous polymer film is not particularly limited, but are preferably from 0.001 to 50 μm and from 10 to 99%, respectively.

The porous coating layer may include either inorganic particles or organic particles, or both.

The inorganic particles are not particularly limited if they are electrochemically stable. That is, the inorganic particles that may be used in the present disclosure are not particularly limited if they do not cause oxidation and/or reduction reactions in an operating voltage range (for example, from 0 to 5V for Li/Li$^+$) of an electrochemical device being applied. In particular, when inorganic particles capable of transporting ions are used, ionic conductivity in an electrochemical device increases, contributing to performance improvement. Also, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution.

The inorganic particles include, as a non-limiting example, inorganic particles having a high dielectric constant greater than or equal to 5, preferably, greater than or equal to 10, inorganic particles capable of transporting lithium ions, or mixtures thereof.

The inorganic particles having a dielectric constant greater than or equal to 5 include, as a non-limiting example, $BaTiO_3$, $Pb(Zr,Ti)O_3$(PZT), $Pb_{1-x}La_xZr_{1-y}Ti_yO_3$(PLZT), $PB(Mg_{3}Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or mixtures thereof.

In the specification, the 'inorganic particles capable of transporting lithium ions' refer to inorganic particles that contain lithium atoms and have a function of transferring a lithium ion without storing lithium, and the inorganic particles capable of transporting lithium ions includes, as a non-limiting example, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as LiI—$Li_2S$—$P_2S_5$, or mixtures thereof.

Also, the organic particles are advantageous in aspects of air permeability, thermal shrinking characteristics, and peeling strength, and have excellent binding characteristics with the binder polymer.

The organic particles include, as a non-limiting example, particles consisting of various types of polymers such as polystyrene, polyethylene, polyimide, melamine-based resin, phenol-based resin, cellulose, modified cellulose (carboxymethyl cellulose), polypropylene, polyester (polyethyleneterephthalate, polyethylenenaphthalate, and polybutyleneterephthalate), polyphenylene sulfide, polyaramide, polyamide imide, and butylacrylate-ethylmethacrylate copolymers (for example, crosslinked polymers of butylacrylate and ethylmethacrylate). The organic particles may consist of at least two types of polymers.

A size of the inorganic particles or the organic particles is not limited, but may be each in a range of 0.001 to 10 μm, independently, to form a coating layer with a uniform thickness and have a proper porosity.

The binder polymer is not limited to a particularly type if it functions to connect at least one type of particles of inorganic particles and organic particles and stably hold them, and includes, as a non-limiting example, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, singularly or in combination.

A composition ratio of the particles and the binder polymer in the porous coating layer may be, for example, in a range of 50:50 to 99:1, or in a range of 70:30 to 95:5, based on the weight. When the content of the particles to the binder polymer is excessively low, improvements in thermal safety of the separator may be reduced, and due to insufficient formation of interstitial volumes between the particles, the pore size and the porosity are reduced, causing a reduction in final battery performance. In contrast, when the content of the particles to the binder polymer is excessively high, the peeling resistance of the porous coating layer may be reduced.

A method of manufacturing a separator according to an exemplary embodiment of the present disclosure is as follows.

First, a resin composition including polymer resin and a diluent is extruded.

Also, the diluent is not limited to a particular type if it is commonly used in the art. The diluent includes, as a non-limiting example, phthalic acid esters such as dibutyl phthalate, dihexyl phthalate, and dioctyl phthalate; aromatic ethers such as diphenyl ether and benzyl ether; fatty acids having 10 to 20 carbons such as palmitic acid, stearic acid, oleic acid, linoleic acid, and linolenic acid; fatty acid alcohols having 10 to 20 carbons such as palmityl alcohol, stearyl alcohol, oleyl alcohol, and the like; and a fatty acid ester derived from esterification of one or more saturated or unsaturated fatty acid having from 4 to 26 carbon atoms in the fatty acid group and an alcohol having from 1 to 8 hydroxy group(s) and from 1 to 10 carbon atom(s), such as palmitic acid mono-, di- or triester, stearic acid mono-, di- or triester, oleic acid mono-, di- or triester, linoleic acid mono-, di- or triester, and the like.

Also, the diluent may include mixtures of at least two of the above substances.

A weight ratio of the polymer resin to the diluent may be in a range of 80:20 to 10:90, preferably in a range of 70:30 to 20:80, preferably in a range of 50:50 to 30:70. When the weight ratio is more than 80:20, that is, the content of the polymer resin is high, the porosity reduces, the pore size decreases, and interconnection of the pores is insufficient, and thus the permeability significantly reduces, as well as the viscosity of the polymer resin solution increases and the extrusion load increases, which makes processing difficult. When the weight ratio is less than 10:90, that is, the content of the polymer resin is low, the blending of the polymer resin and the diluent reduces and they are not thermodynamically miscible and are extruded in gel form, causing a problem with breakage during stretching and non-uniform thickness, and the manufactured separator may reduce in strength.

To manufacture the composite separator, the present disclosure first mixes a portion or all of the materials using Henschel Mixer, Ribbon Blender, and Tumbler Blender. Subsequently, melt-kneading is performed by a screw extruder such as a single-screw extruder and a twin-screw extruder, a blender, and a mixer, and the mixture is extruded from a T-die or annular die. The blended/extruded melt may be solidified by compressed cooling, and a cooling method includes a direct contact method with a cooling medium such as cool air or cool water and a contact method with a roll or a press cooled by a coolant.

Subsequently, the extruded resin composition is stretched to obtain the polymer resin film. In this instance, as a stretching method, a common method known in the art may be performed, and the stretching method includes, as a non-limiting examples, MD (longitudinal direction) uniaxial stretching by a roll stretcher, TD (transverse direction) uniaxial stretching by a tenter, two step biaxial stretching by a combination of a roll stretcher and a tenter or a combination of a tenter and a tenter, and concurrent biaxial stretching by a concurrent biaxial tenter or inflation molding. Specifically, the stretching of the extruded resin composition may be performed by uniaxial stretching at least once in the MD direction or the TD direction, or biaxial stretching at least once in the MD direction and the TD direction.

A stretch ratio is three times or more each in the longitudinal direction and the transverse direction, preferably, from 5 times to 10 times, and a total stretch ratio (total area magnification) is 20 times or more, preferably, from 20 to 80 times.

If the stretch ratio in one direction is less than 3 times, orientation in one direction is insufficient, and at the same time, the property balance between the longitudinal direction and the transverse direction is broken and the tensile strength and puncture strength may reduce. Also, when the total stretch ratio is less than 20 times, non-stretching occurs and pore formation may not be achieved, and when the total stretch ratio is more than 80 times, breakage occurs during stretching and shrinkage of a final film increases.

In this instance, a stretching temperature may change based on a melting point of the polymer resin used and a concentration and a type of the diluent, and preferably, the stretching temperature is selected within a temperature range in which 30 to 80 wt % of crystalline domains of the polymer resin in the film melt.

When the stretching temperature is selected within a temperature range lower than the temperature at which 30 wt % of crystalline domains of the polymer resin in the sheet molding product melt, softness of the film is low, stretching characteristics are poor, and the likelihood that breakage will occur during stretching is high, and at the same time, non-stretching occurs. In contrast, when the stretching temperature is selected within a temperature range higher than the temperature at which 80 wt % of crystalline domains melt, stretching is easy and non-stretching occurs less frequently, but due to partial over-stretching, a thickness deviation occurs, and an orientation effect of resin are low, and thus, the properties significantly reduce. In this instance, an extent to which the crystalline domains melt based on temperature may be obtained from differential scanning calorimeter (DSC) analysis of the film molding product.

Subsequently, the diluent is extracted from the stretched film to obtain the porous polymer film. Specifically, the diluent is extracted from the stretched film using an organic solvent, and is then dried.

As the extraction solvent used in extracting the diluent, it is preferred to use an extraction solvent which serves as a poor solvent for the polymer resin and a good solvent for the diluent, and has a boiling point lower than the melting point of the polymer resin and thus is dried quickly. The extraction solvent includes, as a non-limiting example, hydrocarbons such as n-hexane or cyclohexane, halogenated hydrocarbons such as methylene chloride, 1,1,1-trichloroethane and fluorocarbon, alcohols such as ethanol or isopropanol, and ketones such as acetone or 2-butanone.

As the extraction method, all general solvent extraction methods including an immersion method, a solvent spray method, and an ultrasonic method may be used, singularly or in combination. In the extraction, the content of the remaining diluent is preferably less than or equal to 1 wt %. When the content of the remaining diluent is more than 1 wt %, the properties reduce and the permeability of the porous membrane reduces. An amount of the remaining diluent may be influenced by an extraction temperature and an extraction time, and to increase the solubility of the diluent and the organic solvent, a high extraction temperature is good, but considering the safety problem with the boiling of the organic solvent, the extraction temperature is preferably less than or equal to 40° C. When the extraction temperature is less than or equal to a freezing point of the diluent, extraction efficiency greatly drops, and accordingly, the extraction temperature should be certainly higher than the freezing point of the diluent.

Also, the extraction time may change based on a thickness of the porous polymer film being manufactured, but when the thickness is from 10 to 30 μm, 2~4 minutes are proper.

The thickness of the porous polymer film obtained as above is not particularly limited, but is preferably from 5 to 50 μm, and the pore size and the porosity of the porous substrate is not particularly limited, but are preferably from 0.001 to 50 μm and from 10 to 99%, respectively.

Subsequently, the slurry for forming a porous coating layer is coated on at least one surface of the porous polymer film. To this end, first, the slurry for forming a porous coating layer is prepared, and the slurry is prepared by dispersing, in a solvent, at least one type of particles of inorganic particles and organic particles together with binder polymer. That is, the slurry may include either inorganic particles or organic particles, or both.

As the solvent included in the slurry, it is preferred to use a solvent which allows uniform mixing of the particles and the binder polymer and subsequently can be removed at ease. Non-limiting examples of available solvents may include acetone, tetrahydrofuran, methylene chloride, chloroform, dimethylformamide, N-methyl-2-pyrrolidone (NMP), cyclohexane, water, or mixtures thereof.

The slurry for forming a porous coating layer is coated on at least one surface of the porous polyolefin film, and a specific method for coating may use a common coating method known in the art, and various methods may be used, for example, dip coating, die coating, roll coating, comma coating, or mixtures thereof. Also, the porous coating layer may be selectively formed on both surfaces or only one surface of the porous polyolefin film.

Subsequently, the porous polyolefin film coated with the slurry is heat-set to obtain the composite separator with the porous coating layer.

The heat setting is a process which fixes the film and applies heat, and although the film tends to shrink, forcibly holds the film to remove residual stress. As a heat setting temperature increases, the shrinkage preferably reduces, but when the heat setting temperature is excessively high, the polyolefin film partially melts and closes the formed micro pores and the permeability may reduce.

Dissimilar to the traditional process that stretches to the polyolefin film, extracts the diluent, and performs heat setting, the present disclosure stretches to the polyolefin film, extracts the diluent, coats with the slurry for forming a porous coating layer, and performs heat setting, so heat setting is performed on the coated slurry rather than the polyolefin film, and heat is not directly applied to the polyolefin film.

Thus, although heat setting is performed at higher temperature than the method according to the related art, melting of the polyolefin film may be suppressed. Also, because the quantity of heat directly applied to the polyolefin film is small, as opposed to fibrils of the heat-set polyolefin film according to the related art, fibrils of the polyethylene substrate adjacent to the porous coating layer are formed thin. Thus, the fibrilar number density per unit area of the porous polymer film surface adjacent to the porous coating layer increases, an interfacial contact area with the coating slurry increases, and when heat setting is performed in a temperature range higher than a glass transition temperature ($T_g$) or a melting point ($T_m$) of the coating slurry, wettability of the slurry on the fibrilar structure of the porous polyolefin film may be improved.

The heat setting temperature is preferably adjusted to Tm−1° C. or less, and in this instance, Tm corresponds to the melting point of the polyolefin.

According to an exemplary embodiment of the present disclosure, when polyolefin, to be specific, polyethylene is used as the polymer resin, the heat setting temperature may be from 131 to 134° C., preferably, from 131 to 133° C., and when the heat setting temperature satisfies this range, the binding strength (peeling strength) of the porous coating layer and the porous polymer film may be improved, the structural stability may be ensured, and air permeability and specific-resistance may be lowered.

Also, the heat setting may be performed using a heat source facing in a perpendicular direction to the surface of the slurry coated on the porous polymer film. As the heat source, hot air of a hot air dryer may be used, but a variety of other examples may be used if it can provide the effect of heat setting.

In the traditional method of drying at a relatively low temperature after coating, the binder polymer in the coated slurry, in particular, crystalline polymer with poor solubility, is distributed, but not dispersed well, in the coating layer after solvent volatilization.

In contrast, according to an exemplary embodiment of the present disclosure, in the heat setting step, because the heat source of high temperature is applied in the perpendicular direction to the surface of the slurry coated on the porous polymer film, crystalline binder polymer between the particles or crystalline binder polymer incompletely bound with the particles is re-disposed by the recrystallization exerted by the high temperature heat source and the resistance by the binder polymer, and thus, the resistance caused by non-uniform dispersion in the coating layer may significantly reduce.

A thickness of the porous coating layer formed as above is not particularly limited, but may be in a range of 0.01 to 20 μm, and a pore size and a porosity is not particularly limited, but the pores size may be in a range of 0.001 to 10 μm and the porosity may be in a range of 10 to 99%. The pore size and the porosity mainly depends on the size of the particles used, and when particles with a grain diameter, for example, less than or equal to 1 μm are used, the resulting pores show approximately 1 μm or less in size.

In a state that the particles are packed in the porous coating layer and come into contact with each other, the particles are bound with each other by the binder polymer, thereby interstitial volumes are formed between the particles and the interstitial volumes between the particles become a void space to form pores.

That is, the binder polymer allows the particles to be adhered to each other to maintain the bound state of the particles, and for example, the binder polymer connects and holds the particles. Also, the pores of the porous coating layer are pores formed with the interstitial volumes between the particles that define voids, and this is a space defined by the particles substantially in surface contact in a closed packed or densely packed structure by the particles. This pore structure is filled with an electrolyte solution to be injected later, and the filled electrolyte solution may provide a channel for movement of lithium ions essential to operate a battery through the pores of the porous coating layer.

As described in the foregoing, the method of manufacturing a separator according to an exemplary embodiment of the present disclosure does not need a heat setting process, a winding and slitting process, and an unwinding process after the diluent extraction process, as opposed to the manufacturing method according to the related art as shown in FIG. 1.

Here, the winding process represents a step of winding, on a roller, the porous polymer film obtained through the extrusion/stretching/extraction steps or the composite separator obtained through slurry coating, and the slitting process represents a step of cutting an unnecessary part off from both ends when winding the porous polymer film or the composite separator.

The method according to the related art performs the winding and slitting process after heat setting of the porous polymer film, and for slurry coating, needs to unwind the wound film, and after the slurry coating and drying process, performs the winding and slitting process again, finally followed by the packing step.

In this instance, according to an exemplary embodiment of the present disclosure, a number of winding and slitting processes reduces to one time instead of two times as in the method according to the related art, and a loss of a portion of the porous polymer film caused by the winding and slitting process is prevented, resulting in yield increase.

Also, because of omission of an unwinding process performed before the slurry coating step after the winding and slitting process in the method according to the related art, the space utility and process costs may be saved. Further, because a slitting process before the slurry coating step or a winding/unwinding process is not performed, ultra-wide and large-area coating is enabled, occurrence of defects in a final separator such as wrinkles, pinholes, and scratches remarkably decreases, and an uncoated area reduces.

Also, instead of two separate thermal treatment processes in the method according to the related art such as the heat setting process after the diluent extraction and the drying process after slurry coating, through improvements to a single thermal treatment process of the heat setting process after slurry coating, a single heat setting oven may be used rather than two separate ovens such as a dry oven and a heat setting oven, and the space utility and cost savings may be achieved.

According to one aspect of the present disclosure, there is provided an electrochemical device including a cathode, an anode, and a separator interposed between the cathode and the anode, in which the separator is the above-described separator for an electrochemical device.

The electrochemical device may be manufactured by a common method known in the art, and for example, may be manufactured by assembling the cathode and the anode with the separator interposed between the cathode and the anode and pouring an electrolyte solution.

The electrode to be applied together with the separator is not particularly limited, and may be manufactured by binding an electrode active material to an electrode current collector by a common method known in the art.

Of the electrode active material, a cathode active material includes, as a non-limiting example, a general cathode active material that may be conventionally used in a cathode of an electrochemical device, and particularly, it is preferred to use lithium manganese oxide, lithium cobalt oxide, lithium nickel oxide, lithium iron oxide, or lithium composite oxides thereof. An anode active material includes, as a non-limiting example, a general anode active material that may be conventionally used in an anode of an electrochemical device, and particularly, a lithium adsorption material is preferred such as a lithium metal or a lithium alloy, carbon, petroleum coke, activated carbon, graphite, or other carbons.

A non-limiting example of a cathode current collector includes a foil made from aluminum, nickel, or a combination thereof, and a non-limiting example of an anode current collector includes a foil made from copper, gold, nickel or copper alloy or combinations thereof.

The electrolyte solution that may be used in an exemplary embodiment of the present disclosure may be an electrolyte solution in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but is not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

The pouring of the electrolyte solution may be performed in any suitable step of a battery manufacturing process based on a manufacturing process and required physical properties of a final product. That is, the pouring of the electrolyte solution may be applied before battery assembly of an electrochemical device or in the final step of battery assembly.

A process of applying the separator according to an exemplary embodiment of the present disclosure to a battery includes a general process such as a winding process, as well as a lamination/stacking process and a folding process of the separator and the electrode.

Hereinafter, the present disclosure will be described in detail through examples to help understanding. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

Example 1-1: Manufacture of Separator

High density polyethylene with a weight average molecular weight of 500,000 as polyolefin and liquid paraffin with a kinematic viscosity of 68.00 cSt as a diluent were extruded using a weight ratio of 35:65 at the temperature of 210° C. Stretching was performed at a stretching temperature of 115° C. and a stretch ratio of seven times each in a longitudinal direction and a transverse direction. Subsequently, the diluent, i.e., the liquid paraffin was extracted using methylene chloride as an extraction solvent under the condition of 2 m/min to obtain a porous polyolefin film with an average pore size of 0.04 μm.

Subsequently, $Al_2O_3$ particles with an average grain diameter of 0.5 μm/cyanoethylpolyvinylalcohol (Cyano resin CR-V, Shin-Etsu Chemical, Ltd.)/PVDF-HFP5 (LBG2, Arkema, Inc.)/acetone was mixed at a weight ratio of 13.5/0.225/1.275/85 to prepare a slurry for forming a porous layer.

The slurry was coated in a thickness of 3.5 μm on one surface of the porous polyolefin film having undergone the diluent extraction process, and subsequently, heat setting was performed at 132.5° C. and 5 m/min, to manufacture a 14.5 μm-thick separator with the porous coating layer. The porous coating layer of the separator has an average pore size of 0.4 μm and an average porosity of 55%.

Example 1-2: Manufacture of Coin Cell 1.0M LiPF$_6$ was added to an organic solvent including ethylene carbonate/ethyl methyl carbonate at a volumetric ratio of 1:2 to prepare an electrolyte solution. After the separator was sufficiently soaked in the electrolyte solution, only the separator was used to manufacture a coin cell.

Example 2-1: Manufacture of Separator

A separator for an electrochemical device was manufactured by the same method as Example 1-1, except that a slurry for forming a porous layer was prepared using organic particles (Zeon, FX9022) with an average grain diameter of 0.5 μm composed of a crosslinked polymer compound of butylacrylate and ethylmethacrylate, polybutylacrylate as binder polymer, carboxymethyl cellulose (CMC) as a dispersant, and water as a solvent at a weight ratio of 18/1.5/0.5/80.

Example 2-2: Manufacture of Coin Cell

An electrochemical device was manufactured in the same manner as Example 1-2, except that the separator of Example 2-1 was used as a separator.

Comparative Example 1-1: Manufacture of Separator

The same method as Example 1 was performed up to a process of extracting a diluent from a polyethylene film. That is, high density polyethylene with a weight average molecular weight of 500,000 as polyolefin and liquid paraffin with a kinematic viscosity of 68.00 cSt were extruded using a weight ratio of 35:65 at the temperature of 210° C. Subsequently, stretching was performed at a stretching temperature of 115° C., and a stretch ratio of seven times each in a longitudinal direction and a transverse direction. Subsequently, after the diluent was extracted, heat setting was performed at 130° C. and 5 m/min, thereby a separator consisting of a porous polyolefin film was manufactured.

Comparative Example 1-2: Manufacture of Coin Cell

An electrochemical device was manufactured in the same manner as Example 1-2, except that the separator of Comparative example 1-1 was used as a separator.

Comparative Example 2-1: Manufacture of Separator

A slurry for forming a porous coating layer including Al$_2$O$_3$ particles/cyanoethyl polyvinylalcohol/PVDF-HFP/acetone at a weight composition ratio of 13.5/0.225/1.275/85 was prepared.

The slurry for forming a porous coating layer was coated on one surface of the porous polyolefin film obtained in Comparative example 1-1, and then dried at 60° C. and 5 m/min.

Comparative Example 2-2: Manufacture of Coin Cell

An electrochemical device was manufactured in the same manner as Example 1-2, except that the separator of Comparative example 2-1 was used as a separator.

Comparative Example 3-1: Manufacture of Separator

A separator for an electrochemical device was manufactured by the same method as Comparative example 2-1, except that a slurry for forming a porous coating layer was prepared using organic particles (Zeon, FX9022) with an average grain diameter of 0.5 μm composed of a crosslinked polymer compound of butylacrylate and ethylmethacrylate, polybutylacrylate as binder polymer, carboxymethyl cellulose (CMC) as a dispersant, and water as a solvent at a weight ratio of 18/1.5/0.5/80.

Comparative Example 3-2: Manufacture of Coin Cell

An electrochemical device was manufactured in the same manner as Example 1-2, except that the separator of Comparative example 3-1 was used as a separator.

Evaluation Example 1: Evaluation of Separator

Each separator manufactured in the above Examples 1-1 and 2-1 and Comparative examples 1-1, 2-1, and 3-1 was measured to determine a thickness, a permeation time, and a fibril diameter, and their results are shown in the following Table 1.

TABLE 1

|  | Example 1-1 | Example 2-1 | Comparative example 1-1 | Comparative example 2-1 | Comparative example 3-1 |
|---|---|---|---|---|---|
| Separator thickness (μm) | 14.5 | 14.5 | 11.0 | 14.5 | 14.5 |
| Permeation time (s/100 ml) | 130 | 130 | 160 | 230 | 200 |
| Fibril diameter (nm) | 25~80 (coating side) 42~130 (bottom side) | 22~77 (coating side) 43~132 (bottom side) | 30'~80 | 30~80 (coating side) 30~80 (bottom side) | 30~80 (coating side) 30~80 (bottom side) |

Referring to the above Table 1, the separators of Examples 1-1 and 2-1 are good in an aspect of a permeation time.

In the above Table 1, the 'coating side' represents the side of one surface of the porous polymer film where the porous coating layer is formed, and the 'bottom side' represents the other surface of the porous polymer film where the porous coating layer is not formed, that is, a part of the porous polymer film to which heat setting is directly applied, and it can be seen that for the separators of Examples 1-1 and 2-1 manufactured according to the present disclosure, the coating side fibril has a smaller diameter than the bottom side fibril, whereas fibrils of the same diameter are formed in the porous substrate of the separators of Comparative examples 1-1, 2-1 and 3-1.

Figure 4:
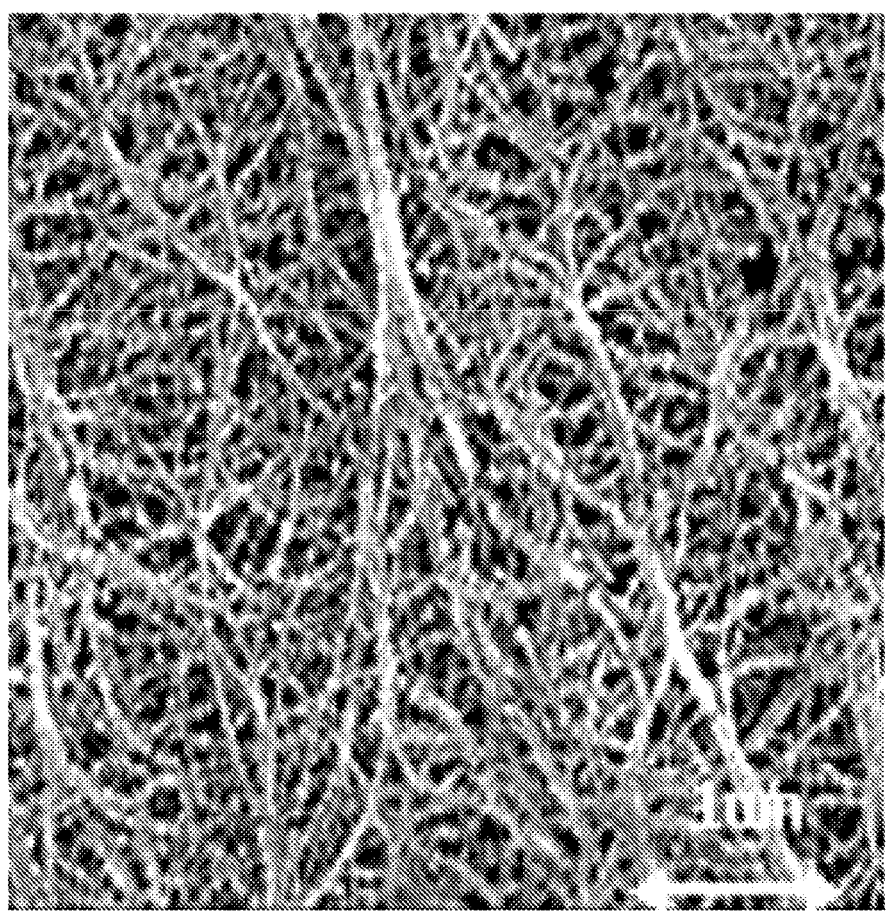
FIG. 4 is an enlarged photographic image of a porous polyethylene film which has undergone stretching and extraction.
Figure 5A:
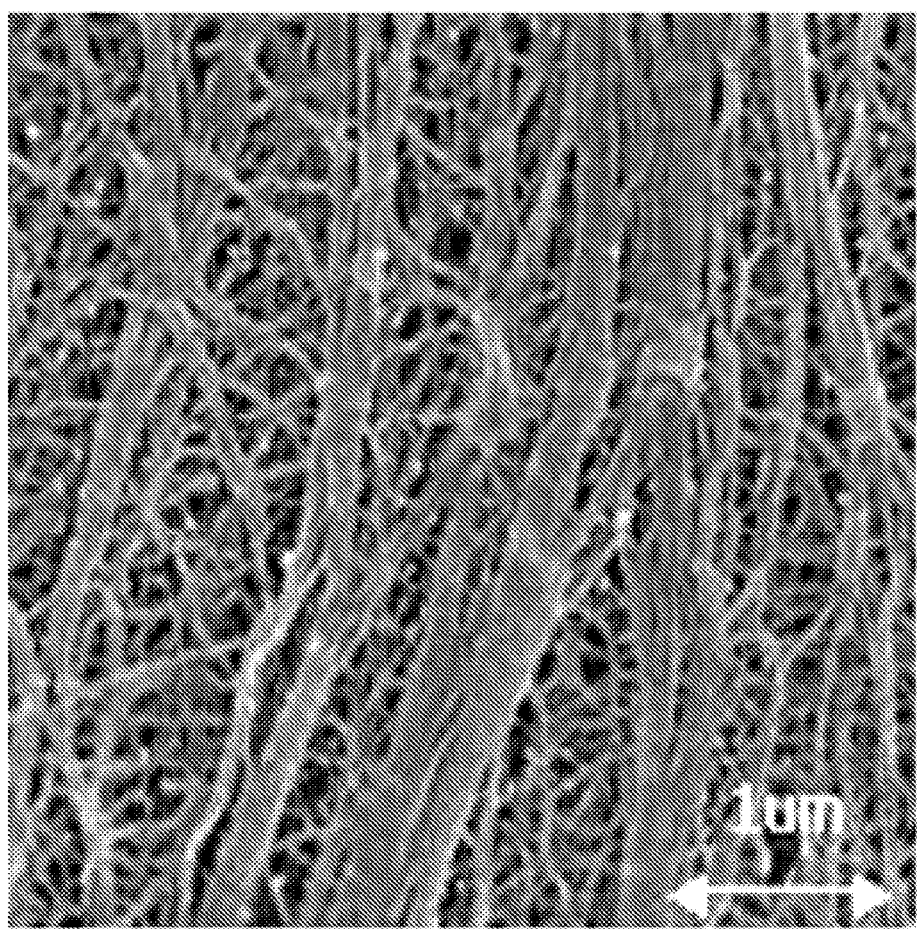
FIG. 5*a* is an enlarged photographic image of a part of a porous polymer film in surface contact with a porous coating layer in a separator of Comparative example 2-1.
Figure 5B:
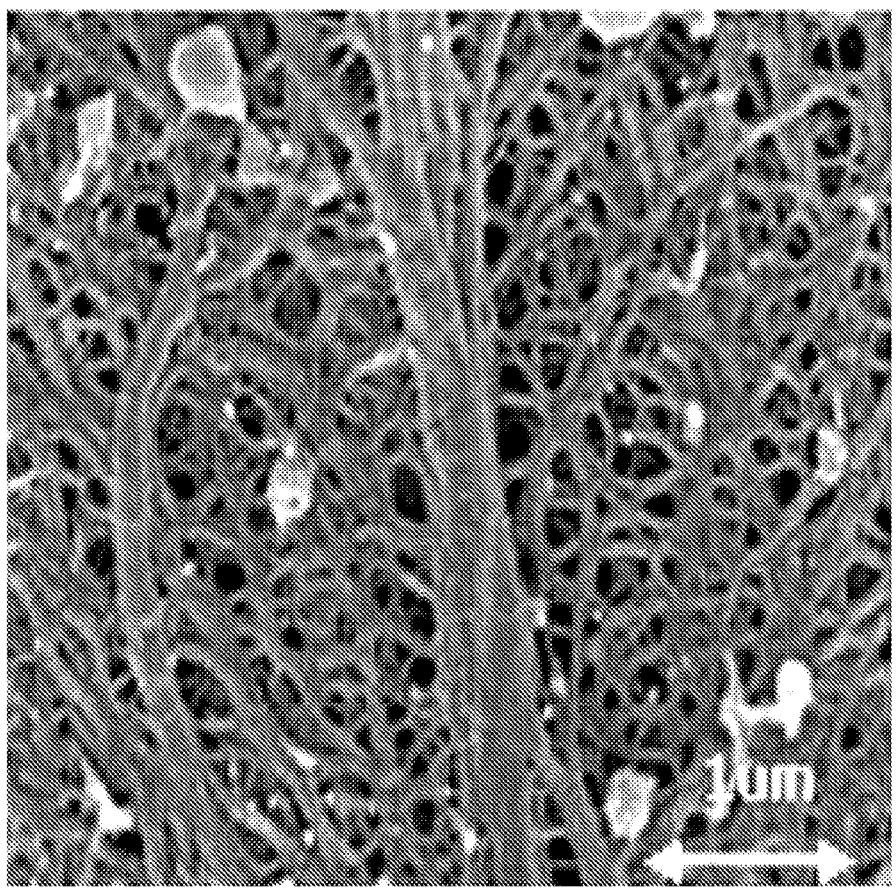
FIG. 5*b* is an enlarged photographic image of a part of a porous polymer film to which heat setting is directly applied, in a separator of Comparative example 2-1.
Figure 6A:
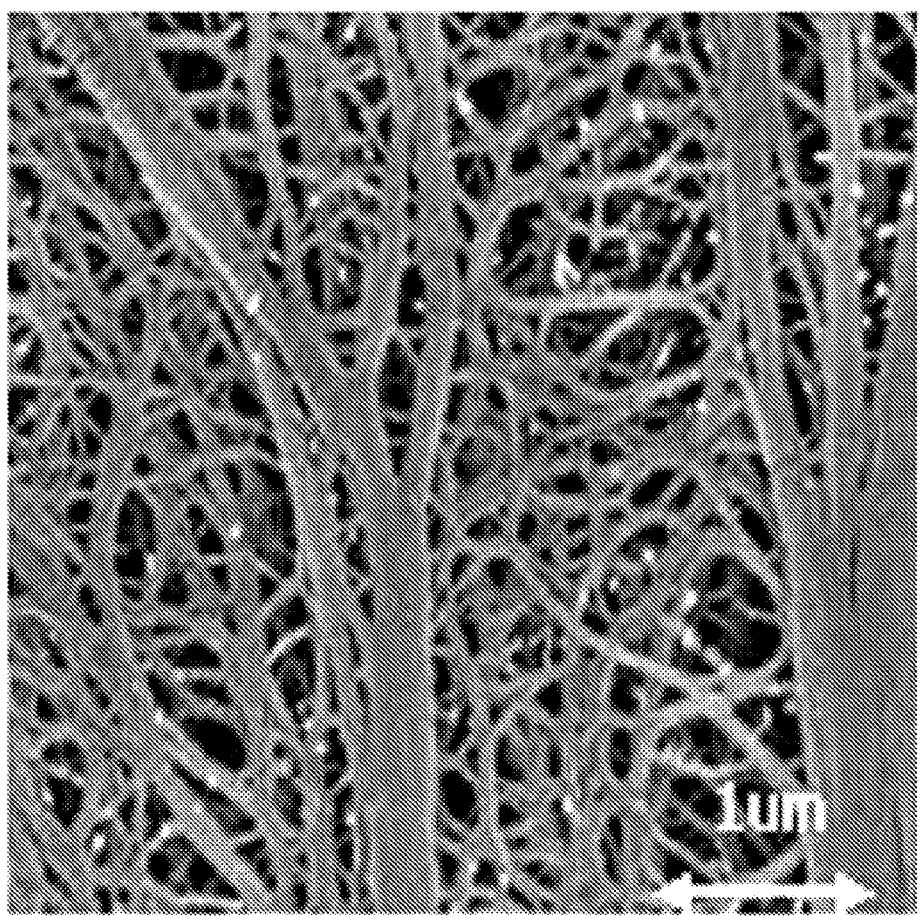
FIG. 6*a* is an enlarged photographic image of a part of a porous polymer film in surface contact with a porous coating layer in a separator of Example 1-1.
Figure 6B:
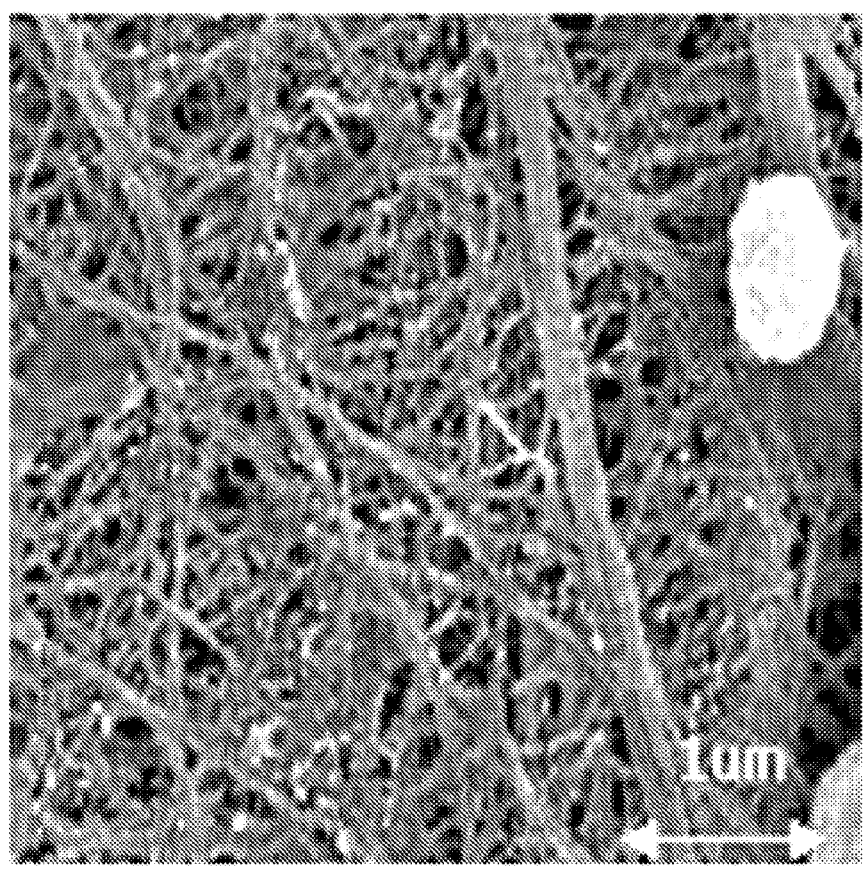
FIG. 6*b* is an enlarged photographic image of a part of a porous polymer film to which heat setting is directly applied, in a separator of Example 1-1.

The fibril diameter difference is shown in the drawings of the present disclosure. Referring to FIG. 4, it can be seen that fibrils of a comparatively small diameter are formed in the porous polyethylene film before heat setting after the extraction process finished, while fibrils of a comparatively large diameter are formed in the porous polymer film to which heat setting is applied (FIG. 5a and FIG. 5b). In contrast, when heat setting is applied after the porous coating layer is formed on one surface of the porous substrate according to Example 1-1, fibrils of a smaller diameter are formed in a part of the porous polymer film to which heat setting is performed through the porous coating layer (FIG. 6b), but fibrils of a comparatively large diameter are formed in a part of the porous polymer film to which heat setting is directly performed (FIG. 6a).

Evaluation Example 2: Evaluation of Coin Cell

The coin cells manufactured in Examples 1-2 and 2-2 and Comparative examples 1-2, 2-2 and 3-2 were kept for one day at room temperature and then measured for separator resistance (ER) by an impedance measuring method, and their results are shown in Table 2.

TABLE 2

| | Example 1-2 | Example 2-2 | Comparative example 1-2 | Comparative example 2-2 | Comparative example 3-2 |
|---|---|---|---|---|---|
| ER(Ohm, Ω) | 0.5~0.6 | 0.6~0.7 | — | 1.0~1.2 | 0.9~1.0 |

As seen from above, it is found that the coin cells of Examples 1-2 and 2-2 according to the present disclosure show lower electrical resistance than the coin cells of Comparative examples 1-2, 2-2 and 3-2, so fibrils of a smaller diameter are formed in the separators of Examples 1-1 and 2-1 according to the present disclosure, leading to a significant effect.

Example 3-1: Manufacture of Separator

High density polyethylene with a weight average molecular weight of 500,000 as polyolefin and liquid paraffin with a kinematic viscosity of 68.00 cSt as a diluent were extruded using a weight ratio of 35:65 at the temperature of 210° C. Stretching was performed at a stretching temperature of 115° C. and a stretch ratio of seven times each in a longitudinal direction and a transverse direction. Subsequently, the diluent, i.e., the liquid paraffin was extracted using methylene chloride as an extraction solvent under the condition of 2 m/min to obtain a porous polyolefin film with an average pore size of 0.04 μm.

Subsequently, a slurry of $Al_2O_3$ particles with an average grain diameter of 0.5 μm/cyanoethylpolyvinylalcohol (Cyano resin CR-V, Shin-Etsu Chemical, Ltd.)/PVDF-HFP (LBG2, Arkema, Inc.)/acetone at a weight ratio of 18.0/0.3/1.7/80 was prepared as a slurry for forming a porous layer.

The slurry for forming a porous coating layer was each coated in a thickness of 4.0 μm on both surfaces of the porous polyethylene film having undergone the diluent extraction process, and subsequently, heat setting was performed at 132.5° C. and 5 m/min, to manufacture a 20 μm-thick separator with the porous coating layer.

Example 3-2: Manufacture of Secondary Battery

The manufactured separator was sufficiently soaked in an electrolyte solution including EC/EMC of a volumetric ratio of 1:2 and 1M $LiPF_6$, and only the separator was used to manufacture a coin cell.

Comparative Example 4-1: Manufacture of Separator

The same method as Example 1 was performed up to a process of extracting a diluent from a polyolefin film. That is, high density polyethylene with a weight average molecular weight of 500,000 as polyolefin and liquid paraffin with a kinematic viscosity of 68.00 cSt were extruded using a weight ratio of 35:65 at the temperature of 210° C. Subsequently, stretching was performed at a stretching temperature of 115° C., and a stretch ratio of seven times each in a longitudinal direction and a transverse direction. Subsequently, after the diluent was extracted, heat setting was performed at 130° C. and 5 m/min, to manufacture a porous polyethylene film.

Subsequently, a slurry for forming a porous layer was prepared in the same manner as Example 3-1.

The slurry for forming a porous coating layer was each coated in a thickness of 4.0 μm on both surfaces of the porous polyethylene film to manufacture a 20 μm-thick separator with the porous coating layer.

Comparative Example 4-2: Manufacture of Secondary Battery

A coin cell was manufactured in the same manner as Example 3-2, except that the separator manufactured as above was used.

Evaluation Example

Each separator manufactured in the above Example 3-1 and Comparative example 4-1 was measured for a thickness, a permeation time, and a peeling strength, and their results are shown in the following Table 3.

Also, the coin cells manufactured in Example 3-2 and Comparative example 4-2 were kept for one day at room temperature and then measured for separator resistance by an impedance measuring method.

TABLE 3

| | Example 1 | Comparative example 1 |
|---|---|---|
| Electrical resistance (Ω) | 1.2~1.4 | 1.4~1.6 |
| Permeation time (sec/100 mL) | 300 | 380 |
| Peeling strength (gf/15 mm) | >70 | 30~40 |

As seen from above, it is found that the separator of Example 3-1 maintains a high peeling strength while exhibiting satisfactory properties in aspects of resistance and air permeability as compared to Comparative example 4-1.

Also, SEM images of the separators manufactured in Example 3-1 and Comparative example 4-1 as observed in cross section are shown in FIGS. 7a and 7b and FIGS. 8a and 8b, respectively.

Figure 7A:
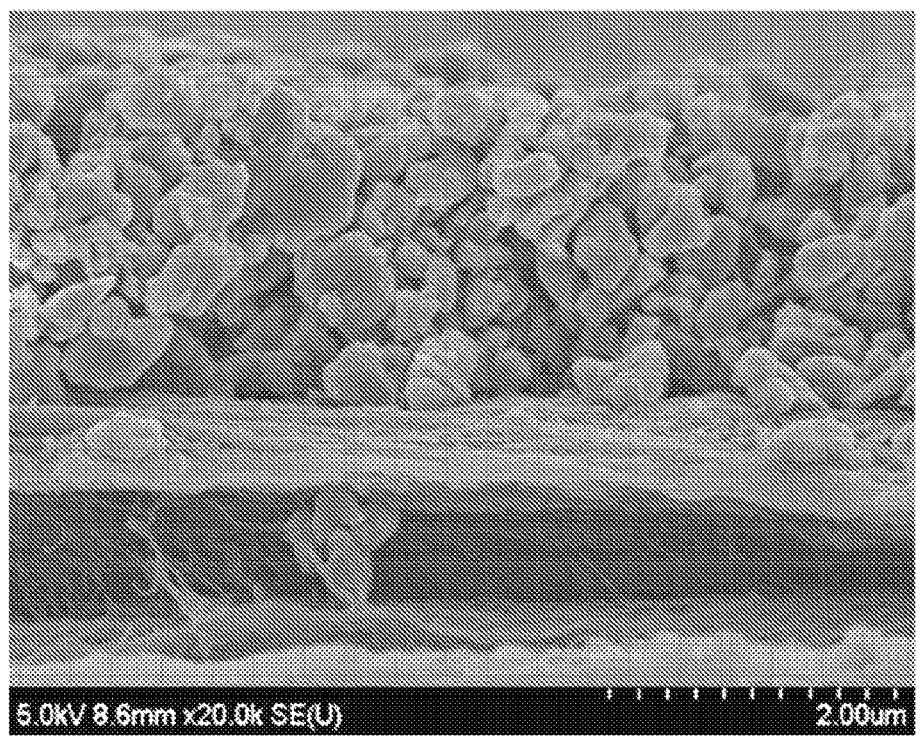
FIGS. 7*a* and 7*b* are scanning electron microscope (SEM) images of a separator manufactured in Example 3-1, as viewed in cross section.
Figure 7B:
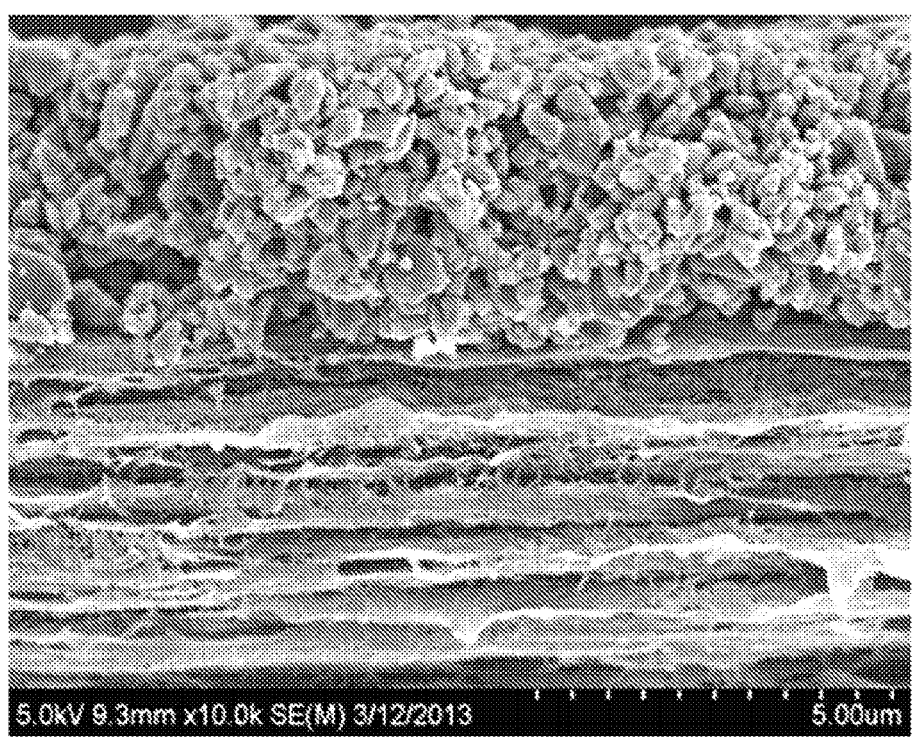
Figure 8A:
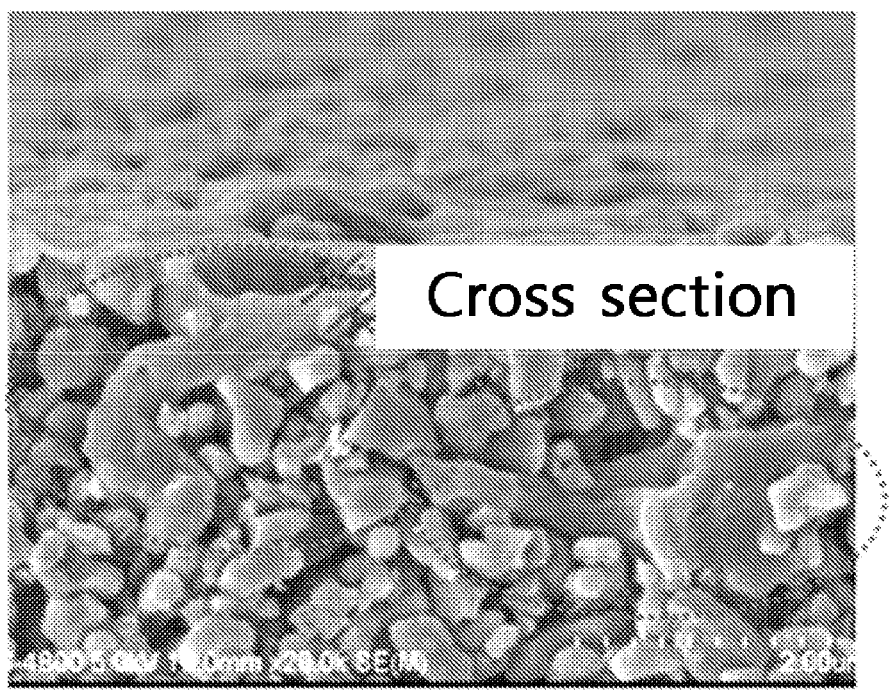
FIGS. 8*a* and 8*b* are SEM images of a separator manufactured in Comparative example 4-1, as viewed in cross section.
Figure 8B:
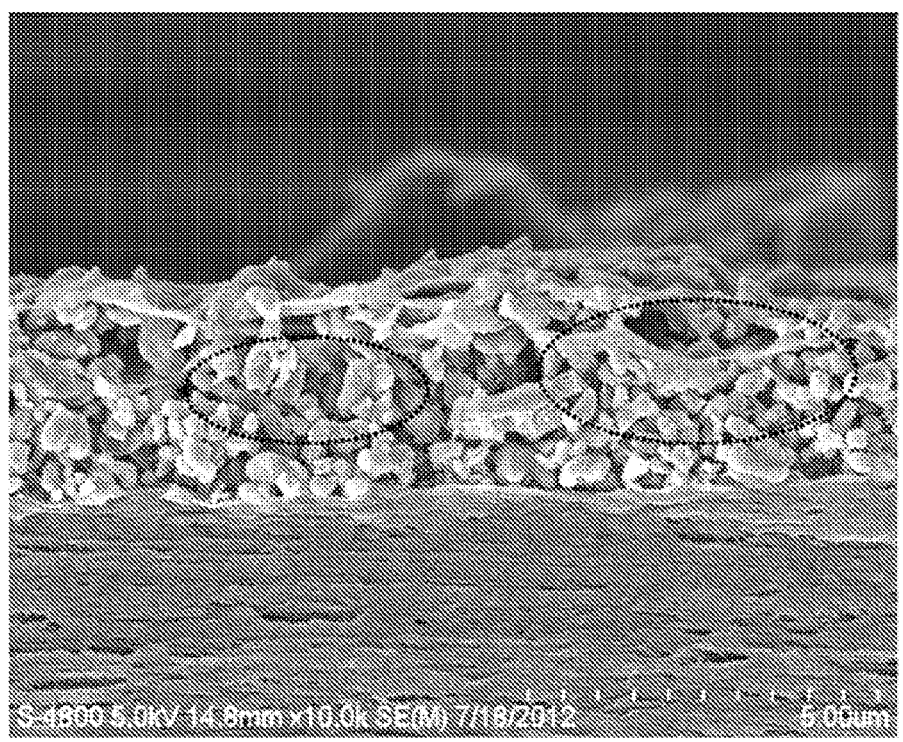

Referring to FIGS. 7a and 7b, it can be seen that the separator of Example 3-1 has the binder polymer uniformly dispersed with a uniform size in the porous coating layer, but for the separator of Comparative example 4-1 as shown in FIGS. 8a and 8b, a size of the binder polymer in the porous coating layer is non-uniform and a portion has a size of 1 μm.

The reason is as follows: In the case of the separator of Example 3-1, because a melting point of the binder polymer used, PVDF-HFP, is about 130° C., the binder polymer slightly melts and is re-arranged by high temperature hot air of 132.5° C. during heat setting, and thus, the binder polymer does not agglomerate.

In the case of the separator of Comparative example 4-1, after slurry coating, drying at about 60° C. is performed to evaporate only acetone, so an agglomeration phenomenon of the binder polymer is more noticeable.

While the present disclosure has been described in connection with a limited number of embodiments and drawings, the present disclosure is not limited thereto, and it should be understood that various changes and modifications may be made by those skilled in the art within the spirit and scope of the present disclosure and equivalents to the appended claims.

What is claimed is:

1. A separator for an electrochemical device, comprising:
   a porous polymer film; and
   a porous coating layer including at least one type of particles of inorganic particles and organic particles and binder polymer, the porous coating layer formed on one surface or both surfaces of the porous polymer film, wherein the porous polymer film has a structure in which multiple fibrils arranged parallel to the surface of the porous polymer film are stacked in layers, and a diameter of the fibril disposed at the side of one surface of the porous polymer film where the porous coating layer is formed is smaller than a diameter of the fibril disposed at a central part in a thickness-wise direction of the porous polymer film.

2. The separator for an electrochemical device according to claim 1, wherein the diameter of the fibril disposed at the side of one surface of the porous polymer film where the porous coating layer is formed is smaller two to four times than the diameter of the fibril disposed at the central part in the thickness-wise direction of the porous polymer film.

3. The separator for an electrochemical device according to claim 1, wherein the diameter of the fibril disposed at the side of one surface of the porous polymer film where the porous coating layer is formed is from 0.01 to 0.04 μm, and the diameter of the fibril disposed at the central part in the thickness-wise direction of the porous polymer film is from 0.04 to 0.08 μm.

4. The separator for an electrochemical device according to claim 1, wherein the separator comprises a porous coating layer formed on only one surface of the porous polymer film, and a diameter of the fibril disposed at the side of one surface of the porous polymer film where the porous coating layer is formed is smaller than a diameter of the fibril disposed at the side of the other surface of the porous polymer film where the porous coating layer is not formed.

5. The separator for an electrochemical device according to claim 1, wherein the diameter of the fibril disposed at the side of one surface of the porous polymer film where the porous coating layer is formed is smaller two to seven times than the diameter of the fibril disposed at the side of the other surface of the porous polymer film where the porous coating layer is not formed.

6. The separator for an electrochemical device according to claim 1, wherein the diameter of the fibril disposed at the side of one surface of the porous polymer film where the porous coating layer is formed is from 0.01 to 0.07 μm, and the diameter of the fibril disposed at the side of the other surface of the porous polymer film where the porous coating layer is not formed is from 0.07 to 0.14 μm.

7. The separator for an electrochemical device according to claim 1, wherein the binder polymer is disposed at an interface of adjacent particles and connects the particles to form a porous structure, and a particle diameter of the binder polymer is from 10 to 100 nm.

8. The separator for an electrochemical device according to claim 1, wherein the porous polymer film is a porous polyolefin film.

9. The separator for an electrochemical device according to claim 8, wherein the porous polyolefin film includes polyethylene; polypropylene; polybutylene; polypentene; polyhexene; polyoctene; copolymers of at least one of ethylene, propylene, butene, pentene, 4-methylpentene, hexene and octene, or mixtures thereof.

10. The separator for an electrochemical device according to claim 1, wherein a thickness of the porous polymer film is from 5 to 50 μm, and a pore size and a porosity are from 0.01 to 50 μm and from 10 to 95%, respectively.

11. The separator for an electrochemical device according to claim 1, wherein the binder polymer includes at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, or mixtures thereof.

12. The separator for an electrochemical device according to claim 1, wherein the inorganic particles include inorganic particles having a dielectric constant greater than or equal to 5, inorganic particles capable of transporting lithium ions, or mixtures thereof.

13. The separator for an electrochemical device according to claim 12, wherein the inorganic particles having a dielectric constant greater than or equal to 5 include $BaTiO_3$, $Pb(Zr,Ti)O_3$(PZT), $Pb_{1-x}La_xZr_{1-y}Ti_yO_3$(PLZT), $PB(Mg_3Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or mixtures thereof.

14. The separator for an electrochemical device according to claim 12, wherein the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ based glass ($Li_xSi_yS_z$, $0<x<3$, $0<y<2$, $0<z<4$), $P_2S_5$ based glass ($Li_xP_yS_z$, $0<x<3$, $0<y<3$, $0<z<7$), or mixtures thereof.

15. The separator for an electrochemical device according to claim 1, wherein the organic particles include polystyrene, polyethylene, polyimide, melamine-based resin, phenol-based resin, cellulose, modified cellulose, polypropylene, polyester, polyphenylene sulfide, polyaramide, polyamide imide, butylacrylate-ethylmethacrylate copolymers, or mixtures thereof.

16. The separator for an electrochemical device according to claim 1, wherein each average grain diameter of the inorganic particles and the organic particles is independently from 0.001 to 10 μm.

17. An electrochemical device comprising a cathode, an anode, and a separator interposed between the cathode and the anode, wherein the separator is the separator for an electrochemical device according to claim 1.

18. The electrochemical device according to claim 17, wherein the electrochemical device is a lithium secondary battery.

* * * * *